UNITED STATES PATENT OFFICE.

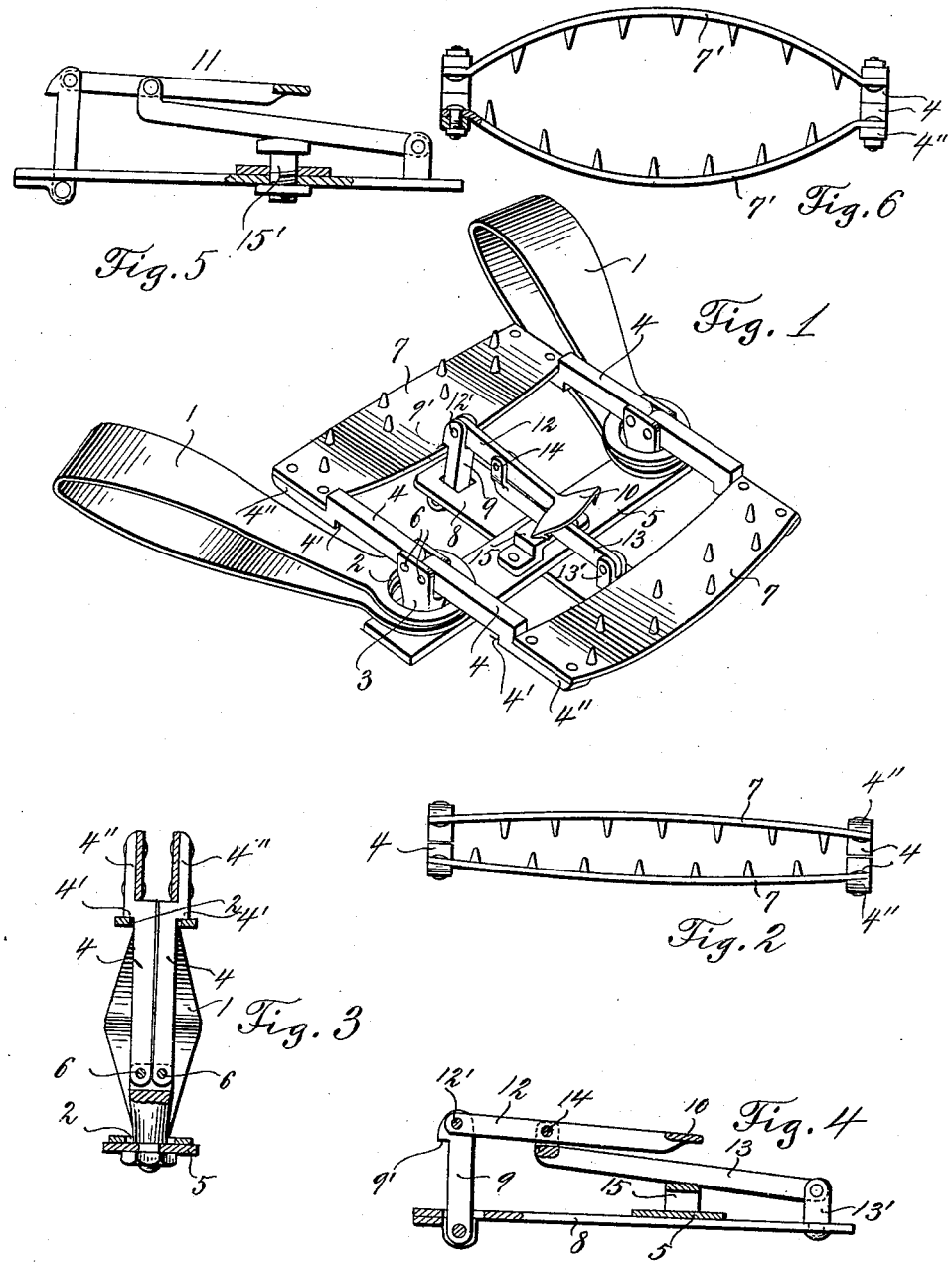

LOUIS A. STEFFENS, OF VINA, CALIFORNIA.

ANIMAL-TRAP.

1,005,667.   Specification of Letters Patent.   Patented Oct. 10, 1911.

Application filed January 3, 1911. Serial No. 600,388.

*To all whom it may concern:*

Be it known that I, LOUIS A. STEFFENS, a citizen of the United States, residing at Vina, in the county of Tehama and State of California, have invented certain new and useful Improvements in Animal-Traps, of which the following is a specification.

This invention relates to improvements in animal traps, and more particularly to that class in which the trapping jaws are brought to a closed position by a spring which is put under tension when setting the trap.

One of the objects of this invention is to provide certain novel features of construction which will render the trap adaptable for use in trapping wild animals around ranges and stock farms without endangering the stock. This result is accomplished by constructing the trap so that when set it will not be released by pressure accidentally created on the same, such as stepping on the trap or the like; but a slight pull on the bait used will release the trap and the same will spring to a closed position about the nose or neck of the beast.

A further object of the present invention is to provide a trap-jaw which will insure the animal's being securely caught when the same is attempting to leave the trap.

With the above and other objects in view and for a clear understanding of the present invention, reference is to be had to the accompanying drawings, in which—

Figure 1 is a perspective view illustrating the device in set position; Fig. 2 is an edge view of the jaws in closed position; Fig. 3 is a sectional view, parts of the trap being illustrated when in a closed position, and Fig. 4 is an illustration of a mechanism whereby the trap is held in set position and through which the trap is released to spring closed; Fig. 5 is a view similar to Fig. 4, illustrating an adjustable support by which the sensitiveness of the setting of the trap may be adjusted; Fig. 6 is a view similar to Fig. 2, illustrating a modified form of gripping plates, the same being detachably mounted on the jaw arms.

Throughout the following detail description and on the several figures of the drawings similar parts are referred to by like reference characters.

Referring more particularly to the drawings, 1 indicates a pair of operating springs of the usual type. Each spring is constructed of flat material and bent upon itself to form a U-shaped member, each end of which is provided with a circular opening 2 of proper dimensions to freely admit the post 3 and a pair of jaw arms 4 for the purpose of closing the jaws. The lower end of the post 3 is fastened to a base plate 5, while the upper end thereof is slotted and the arms 4 are pivoted therein, as at 6. The jaw arms 4 are offset in opposite directions near their outer extremities to provide shoulders 4' for the purpose of limiting the movement of the spring 1, thereby protecting the jaw plates 7 from jarring which would tend to loosen the same.

The jaw plates which are secured to the offset portion 4" of the arm 4 are curved laterally in opposite directions in order to grip the animal more securely, and the lateral curve of the jaw plates co-acting with the offset portion in the jaw arms will allow the latter to move nearer each other when the closing members are closed about the animal. The result is that the jaw arm will not be held apart any material extent when gripping the animal entrapped, thus resisting to a minimum degree the effective closing action of the springs as would be the case if the jaw plates were in alinement with the main portions of the arms 4. The jaws are provided with teeth to catch the animal more securely.

Carried transversely on the base plate 5 is another base plate 8 to which is pivoted a setting member or catch 9 provided with a shoulder 9' to be engaged with one of the jaws when the trap is set. A bait member 10 is carried by the member 12 of a toggle lever 11, the member 12 being pivotally connected, as at 12', to the said catch 9 and the link 13 of the toggle lever is pivoted to the slotted lug 13' extending upwardly from the base member 8. The two members of the toggle lever are pivotally connected, as at 14.

Carried centrally on the base plate 5 on the side adjacent to the toggle-joint is a support 15, the purpose of which is to limit the downward movement of the toggle-joint carrying the bait, said movement otherwise releasing the trap if the same was stepped on, for instance.

In Fig. 5 is illustrated a modified form of support 15', the purpose of which is to thereby adjust the alinement of the toggle so as to attain the desired amount of sensitiveness in the setting of the trap. It will be observed that by this setting device the trap can be set so as to attain the desired sensitiveness without changing the grip of the catch.

Fig. 6 illustrates a modified form of the jaws or closing members. The peculiar advantage resides in the fact that the toothed jaw plates 7' are detachably attached to the jaw arms 4'' so that they may be readily replaced by those more or less curved in order to make the trap more advantageous in use for catching animals of different sizes.

In operation, the bait is properly applied on the bait member 10, the springs are compressed, which may readily be done by stepping on the same, the jaws are spread apart and pushed down flat, and the shoulder 9' of the catch member 9 is caught on one of the jaws 7. A slight pull on the bait by an animal will cause the lever 12 to move outwardly, and from its connection with the link 13, it will withdraw the catch 9 from engagement with the jaw. Thus the jaw will be sprung to a closed position by the operating springs 1 and catch the animal.

It is understood that the present invention may be made in different proportions, and that the details of construction may be varied within the scope of the claims.

Having thus fully described my invention, what is claimed as new is:—

1. In an animal trap, a base, jaw members, means for holding one of said jaw members in open position, said means including a movable catch member and a toggle whose joint is adapted to be broken by the animal when springing the trap, said toggle including a toggle lever connected to said catch member at one end, a bait member carried at the other end, a link connected to the base at one end and to the toggle lever at the other end, and a support for the toggle lever.

2. In an animal trap, a base, spring actuated jaw members pivotally connected to said base, a catch member pivotally connected to the base, adapted to hold said jaw members in open position, a toggle whose joint is adapted to be broken by the animal in an outward direction from the base when springing the trap, said toggle being connected with the catch member, and an adjustable support mounted on the base by which the alinement of the toggle-joint may be varied to change the sensitiveness of the setting of the trap without changing the grip of the catch member.

3. In an animal trap, a base, spring operated jaw members pivotally connected to said base, a catch adapted to hold the jaw members in open position, a toggle-joint connected with said catch member for operation thereof, a bait member carried by said toggle-joint, and means on the base whereby the position of the members of said toggle-joint may be adjusted so as to vary the sensitiveness of the trap.

In testimony whereof I affix my signature in presence of two witnesses.

LOUIS A. STEFFENS.

Witnesses:
FRANK HOLLOWOOD,
AUER M. HENDERSON.